United States Patent [19]

Kobayashi et al.

[11] Patent Number: 5,466,199
[45] Date of Patent: Nov. 14, 1995

[54] METHOD AND APPARATUS FOR CONTROLLING, DURING N-D OR P-D SHIFT, THE ENGINE OUTPUT BY A SECOND THROTTLE VALVE OF A VEHICLE FITTED WITH AN AUTOMATIC TRANSMISSION

[75] Inventors: Hirohisa Kobayashi; Masuo Kashiwabara, both of Atsugi, Japan

[73] Assignee: Unisia Jecs Corporation, Atsugi, Japan

[21] Appl. No.: 211,482

[22] PCT Filed: Jul. 30, 1993

[86] PCT No.: PCT/JP93/01076

§ 371 Date: Mar. 28, 1994

§ 102(e) Date: Mar. 28, 1994

[30] Foreign Application Priority Data

Jul. 30, 1992 [JP] Japan ................................. 4-203922

[51] Int. Cl.⁶ ............................ B60K 20/00; F02D 41/04
[52] U.S. Cl. ........................ 477/107; 477/110; 180/197
[58] Field of Search ............................ 477/107, 109, 477/110, 116; 180/197

[56] References Cited

U.S. PATENT DOCUMENTS

| | | | |
|---|---|---|---|
| 5,050,453 | 9/1991 | Yamaguchi | 477/107 X |
| 5,072,631 | 12/1991 | Fujimoto et al. | 477/107 X |
| 5,184,577 | 2/1993 | Kato et al. | 477/109 X |
| 5,191,953 | 3/1993 | Ito et al. | 477/110 X |
| 5,289,739 | 3/1994 | Muscaro et al. | 477/107 X |
| 5,405,302 | 4/1995 | Yagi et al. | 477/107 |

FOREIGN PATENT DOCUMENTS

| | | | |
|---|---|---|---|
| 61-105228 | 5/1986 | Japan . | |
| 61-116033 | 6/1986 | Japan . | |
| 61-135831 | 6/1986 | Japan . | |
| 361135831 | 6/1986 | Japan | 477/107 |
| 62-67245 | 3/1987 | Japan . | |
| 403279635 | 12/1991 | Japan | 477/107 |
| 404140561 | 5/1992 | Japan | 477/110 |
| 404293627 | 10/1992 | Japan | 477/107 |

*Primary Examiner*—Khoi Q. Ta
*Attorney, Agent, or Firm*—Foley & Lardner

[57] ABSTRACT

The present invention involves control of an increase in engine output of a vehicle fitted with an automatic transmission incorporating a torque converter, during a period from transmission selector operation from a stop range to a drive range up until a speed ratio (Nt/Ne) of engine rotational speed Ne to torque converter output shaft rotational speed Nt falls below a predetermined value. Control is effected by a method involving for example, maintaining a second control valve used for traction control fully closed. As a result of the invention, completion of the gear selecting operation can be accurately judged, and effects due to alleviation of gear selection shock and reduction in the load on components such as the differential can be reliably achieved.

8 Claims, 5 Drawing Sheets

METHOD AND APPARATUS FOR CONTROLLING, DURING N-D OR P-D SHIFT, THE ENGINE OUTPUT BY A SECOND THROTTLE VALVE OF A VEHICLE FITTED WITH AN AUTOMATIC TRANSMISSION

TECHNICAL FIELD

The present invention relates to a method and an apparatus for controlling the engine output of a vehicle fitted with an automatic transmission incorporating torque converter, at the time of moving the shift position (referred to hereunder as selector operation) from a stop range to a drive range.

BACKGROUND ART

Conventionally with vehicles fitted with an automatic transmission incorporating a torque converter, in order to alleviate the gear selection shock and reduce the loading on components such as the differential during selector operation from a stop range (N or P range) to a drive range (D, 1, 2, R range) with the accelerator pedal depressed, or when the accelerator pedal is depressed immediately after selector operation to give a rapid take off, the engine output over the gear change period is reducingly corrected with respect to an output corresponding to the amount of depression of the accelerator pedal.

More specifically, when the engine-rotational speed is above a predetermined value at the time of selector operation, fuel injection amount is reduced or the ignition timing is delayed so as to reduce the engine output. Then, when a time differential of the engine rotational speed changes from a negative to a positive value, that is, when the rotational speed changes from reducing to increasing, it is judged that the gear selecting operation has been completed, and output reduction correction is terminated (see for example Japanese Unexamined Patent Publication No. 61-105228).

With the conventional gear selection control system, when in a stop range with the engine speed reducing from a high speed, then if the accelerator pedal is depressed so as to give a rapid take off immediately after selector operation to a drive range, the following problems arise. That is to say, with the above situation, since as shown in FIG. 6 the engine rotational speed changes to increasing immediately after depressing the accelerator pedal, this gives an erroneous judgement that the gear change has been completed, and the output reduction correction is cancelled. Thus, since the gear selecting operation commences after the increase in engine rotational speed, this gives rise to problems in that gear selection shock cannot be sufficiently alleviated and load on components such as the differential is increased.

In view of the above heretofore encountered problems, it is an object of the present invention to be able to sufficiently alleviate gear selection shock even with the above operation at the time of take off.

It is a further object of the present invention to be able to reduce the load on components such as the differential, thereby facilitating size and weight reduction of such components.

DISCLOSURE OF THE INVENTION

In order to achieve the above objectives, the method and apparatus according to the present invention for controlling the engine output of a vehicle fitted with an automatic transmission comprises, a selector operation detection step or device for detecting a selector operation from a stop range to a drive range of the automatic transmission, a speed ratio detection step or device for detecting a speed ratio of a torque converter output rotational speed with respect to input rotational speed of the torque converter, and an engine output control step or device for controlling an increase in engine output from after a selector operation until a speed ratio detected by the speed ratio detection step or device has fallen below a predetermined value.

With such a construction, selector operation is detected by means of the selector operation detection step or device. Then after the selector operation, there is a lag in the output rotational speed of the torque converter, (the rotational speed of the input side of the mechanical type transmission) with respect to the input rotational speed of the torque converter (the engine rotational speed). This delay correspond to the progress of engagement of the frictionally engaging components inside the mechanical type transmission connected to the output side of the torque converter. The speed ratio of the torque converter thus reduces in accordance with progress of the gear selecting operation.

Here, the engine output control step or device judges that the gear selecting operation has been completed when after the selecting operation, the speed ratio of the torque converter detected by the before-mentioned speed ratio detection step or device falls below a predetermined value. Until that time, it controls the increase in engine output to be input to the automatic transmission.

As a result, completion of the gear selecting operation can be reliably judged, and since the increase in engine output can be continuously controlled up until completion of the gear selecting operation, gear selection shock can always be alleviated.

Consequently, loadings on components such as the differential, due to the sudden torque change can be reduced.

The engine may have an intake system incorporating a first throttle valve connected to an accelerator operation, and a second throttle valve not connected to the accelerator operation and normally maintained fully opened, and the engine output control step or device may be constructed so as to control the increase in engine output by controlling the second throttle valve closing.

With such a construction, control of the second throttle valve closing gives good control of the increase in engine output without influencing conditions such as air-fuel ratio.

Moreover, when a second throttle valve is provided, the construction may be such that the engine output control step or device involves gradually reducing the closing amount of the second throttle valve after the speed ratio has fallen below a predetermined value, until fully open.

In this case, even after completion of the gear selecting operation, any sudden increase of engine output can be suppressed so that the torque change becomes smoother, with an improvement in comfortable.

Furthermore, the construction may be such that a throttle valve for traction control which is controlled to close from fully open when wheel slip above a predetermined value occurs may be used as the second throttle valve. In this case, control can be effected without special equipment, by merely adding a control program.

BEST MODE FOR CARRYING OUT THE INVENTION

Figure 1:
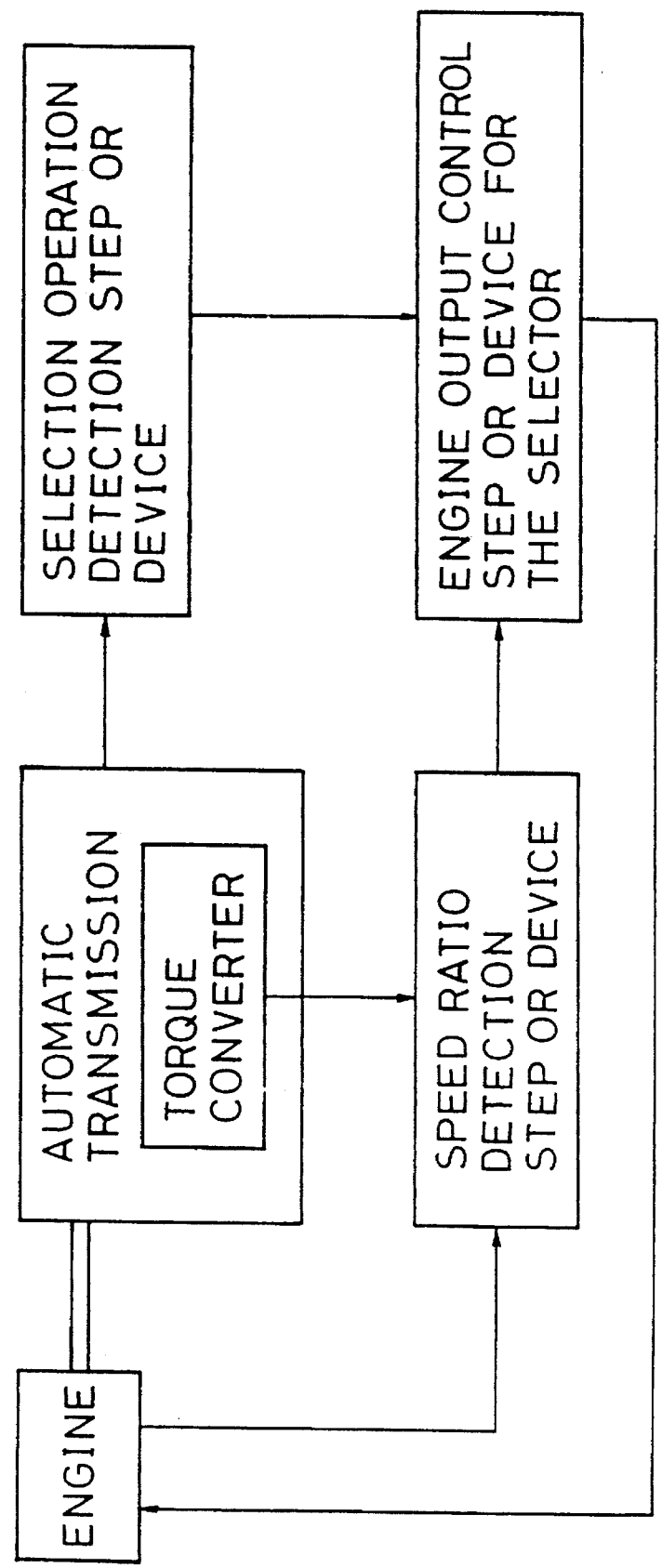
FIG. 1 is a block diagram showing the structure and functions of the present invention.

The previously mentioned method and apparatus for controlling the engine output of a vehicle fitted with an automatic transmission according to the present invention comprises the various steps and devices as shown in FIG. 1. The construction and operation of an embodiment of the present invention are illustrated in FIG. 2 through FIG. 5.

Figure 2:
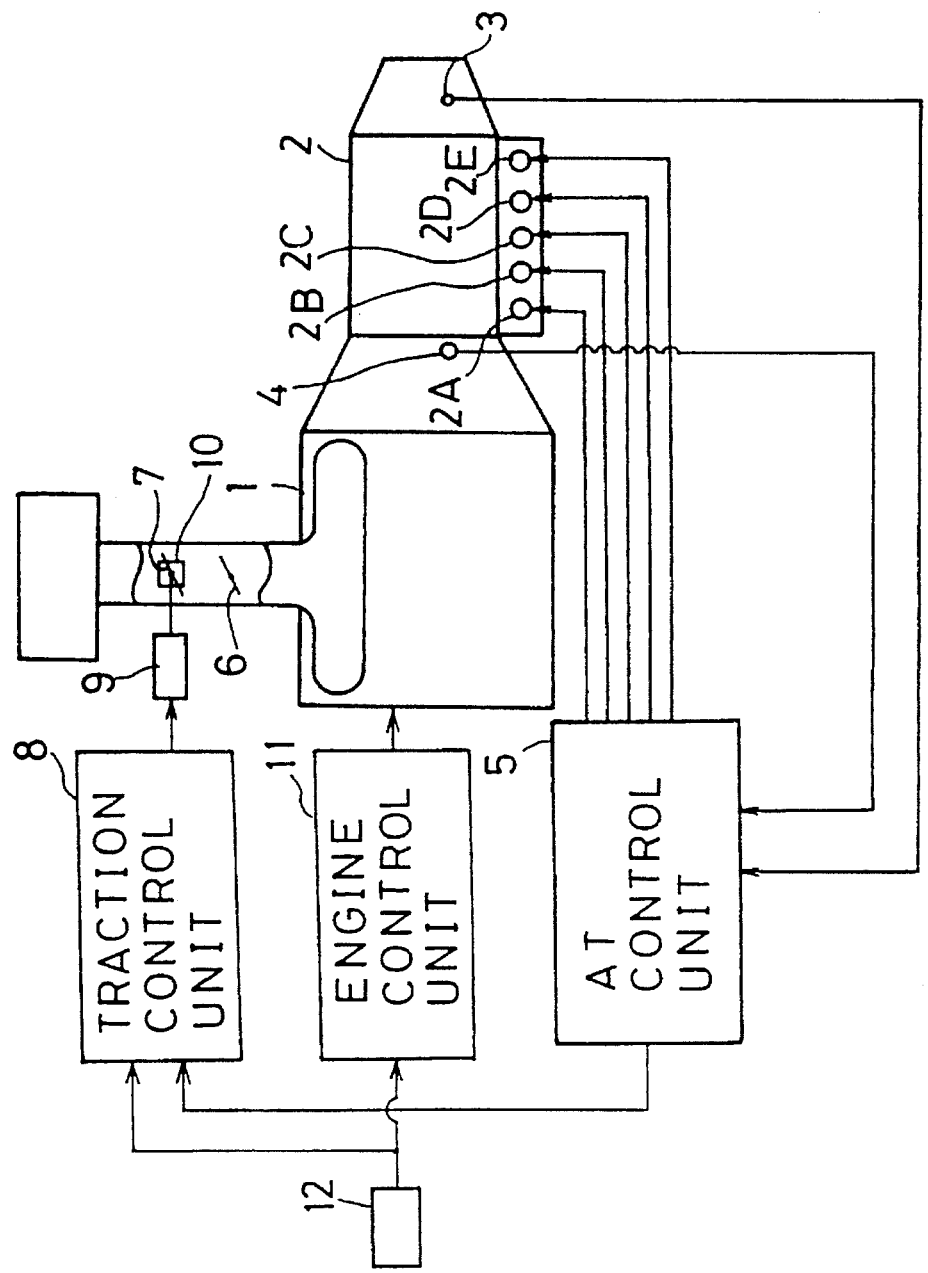
FIG. 2 is a schematic diagram illustrating a system layout of an embodiment according to the present invention.

In FIG. 2 which shows the construction of an embodiment, an automatic transmission 2 incorporating a torque converter is connected to an output shaft of an engine 1.

Figure 3:
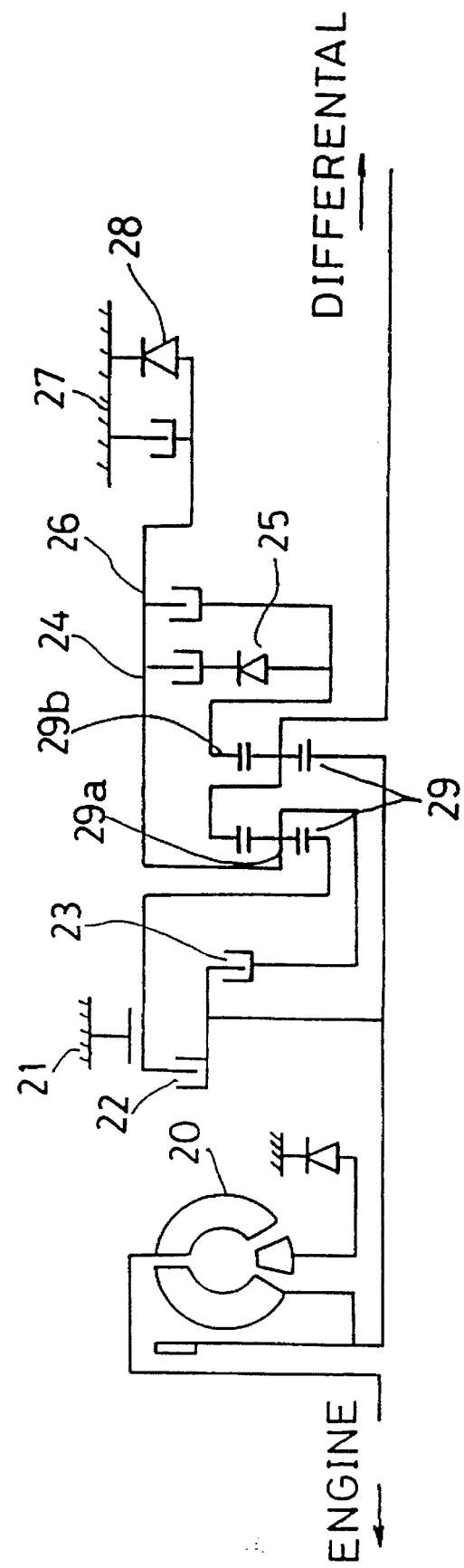
FIG. 3 is a schematic diagram of a hydraulic circuit for an automatic transmission of the embodiment.

As shown in FIG. 3, the automatic transmission 2 comprises a transmission with incorporates various components such as a torque converter 20, a servo band 21, a reversing clutch 22, a high clutch 23, a forward clutch 24, a forward one way clutch 25, an overrunning clutch 26, a low and reverse brake 27, a low one way clutch 28, and front and rear planetary gear sets 29. Solenoid valves 2A–2E (see FIG. 2) for controlling the operating hydraulic pressure for the various speed change components are provided in hydraulic flow paths to the components, and the operating pressure controlled by controlling the valve open duty.

The automatic transmission 2 further incorporates a shift position sensor 3 for detecting the various shift positions, and a turbine rotational speed sensor 4 for detecting the rotational speed NT of the output shaft (turbine shaft) of the torque converter 20. The output signals from these sensors are input to an AT (automatic transmission) control unit 5.

Control signals are output from the AT control unit 5 to the solenoid valves which control the hydraulic pressure to the respective speed change components of the automatic transmission 2, to thereby effect the various speed change controls.

A first throttle valve 6 connected to the accelerator pedal (not shown in the figure) and a second throttle valve 7 for traction control are provided in the intake passage of the engine 1. The second throttle valve 7 is controlled by a control signal from a traction control unit 8, by way of an actuator 9 such as a stepping motor, so as to close from fully open when wheel slip above a predetermined value occurs during acceleration and the like. An opening sensor 10 for detecting valve opening is fitted to the second throttle valve 7.

An engine control unit 11 is also provided for controlling such functions as fuel injection amount and ignition timing of the engine 1. Detection signals from the engine rotational speed sensor 12 are input to the engine control unit 11 and the traction control unit 8.

As well as carrying out the beforementioned normal traction control based on wheel slip, the traction control unit 8 also controls the closing of the second throttle valve 7 according to the present invention, depending on a gear selection control signal from the AT control unit 5 based on the selector operation from the stop range to the drive range of the torque converter 20 and the speed ratio of the torque converter 20.

Figure 4:
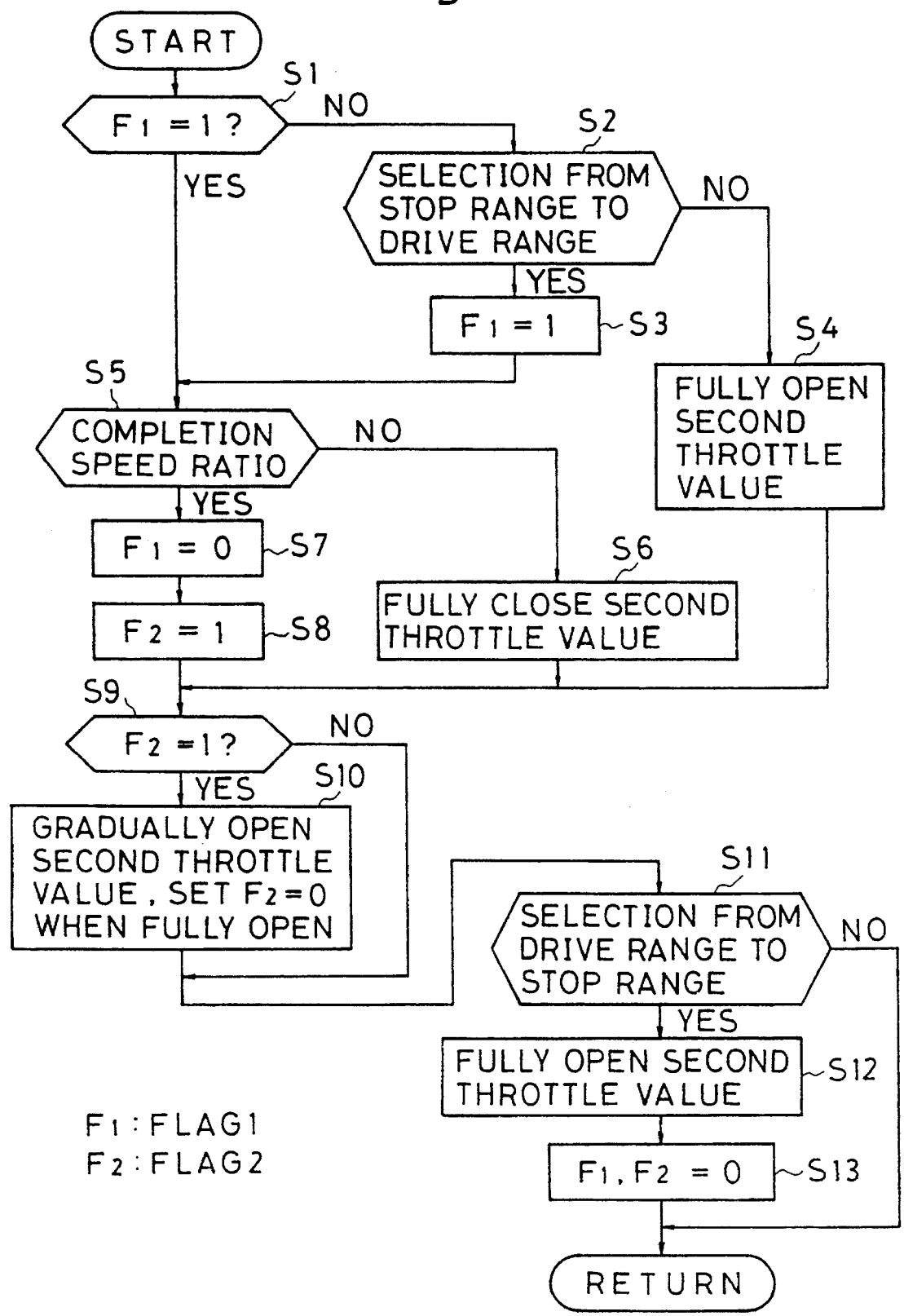
FIG. 4 is a flow chart for an engine output control routine for the embodiment according to the present invention.

As follows is a description in accordance with the flow chart of FIG. 4, of the closing control of the second throttle valve 7 carried out by the traction control unit 8 based on a gear selection control signal from the AT control unit 5.

In step 1, the setting condition of a flag F1 which is set at the time of selector operation from a stop range to a drive range of the automatic transmission 2 is judged.

If judged that flag F1 is not set to 1, control proceeds to step 2 and it is judged if a selector operation from a stop range to a drive range has been made. If judged to have been made, control proceeds to step 3 where flag F1 is set to 1, and then proceeds to step 5. Also, at a later time with the judgement of step 1 as YES, control proceeds to step 5. Here the selector operation detection device comprises the shift position sensor 3 and the judgement function of step 2.

In step 2, if judged that selector operation to the drive range has not been made, control proceeds to step 4 to keep the second throttle valve 7 fully open and, then proceeds to step 9.

In step 5, it is judged if the speed ratio of the torque converter 20 has reached a value corresponding to that at the time of completing a gear selecting operation. Here the speed ratio (Nt/Ne) is obtained as the ratio of the rotational speed Nt of the output shaft (turbine shaft) of the torque converter 20 detected by the turbine rotational speed sensor 4 with respect to the engine rotational speed Ne detected by the engine rotational speed sensor 12. The speed ratio detection device therefore comprises the engine rotational speed sensor 12, the turbine rotational speed sensor 4 and the function of the step 5.

Up until the speed ratio of the torque converter 20 reaches a value corresponding to that at the time of completing a gear selecting operation, control proceeds to step 6, and after fully closing the second throttle valve (minimum opening), proceeds to step 9. The increase in engine output is thus controlled. The engine output control device thus comprises the function of step 6.

In step 5, when judged that the speed ratio of the torque converter 20 has reached a value corresponding to that at the time of completing a gear selecting operation, control proceeds to step 7 where flag F1 is reset to 0, from there to step 8 where flag F2 is set to 1, and then on to step 9.

In step 9, the value of flag F2 is judged. With control via step 4 and step 6, the value of flag F2 is 0, so that control proceeds from step 9 to step 11. However, when control proceeds via step 8 to step 9, it then continues on to step 10 where the opening of the second throttle valve 7 is gradually increased. Then when fully open, the flag F2 is reset to 0 and control proceeds to step 11.

In step 11, it is judged if a selector operation from a drive range to a stop range of the automatic transmission 2 has been made.

If judged that a selector operation to the stop range has been made, control proceeds to step 12 to return the second throttle valve 7 to fully open. Control then proceeds to step 13 where flags F1, F2 are reset to 0, after which the routine is terminated. In step 11, if judged that a selector operation to the stop range has not been made, the routine is terminated in that condition.

Figure 5:
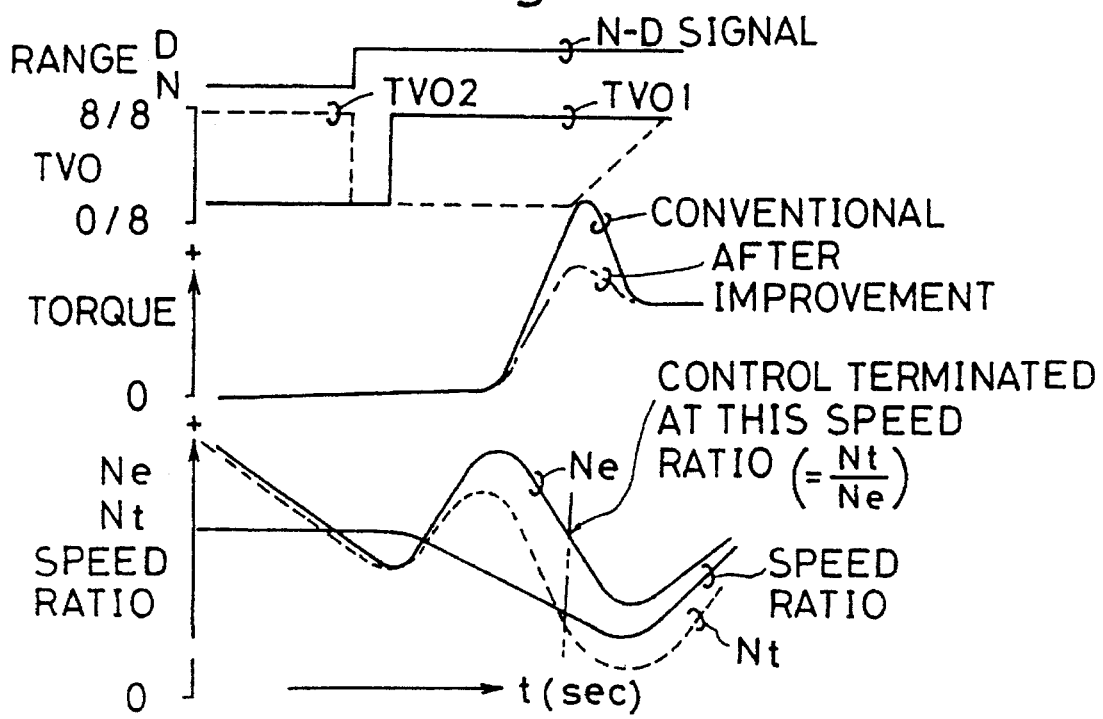
FIG. 5 is a time chart illustrating operating conditions according to the embodiment.
Figure 6:
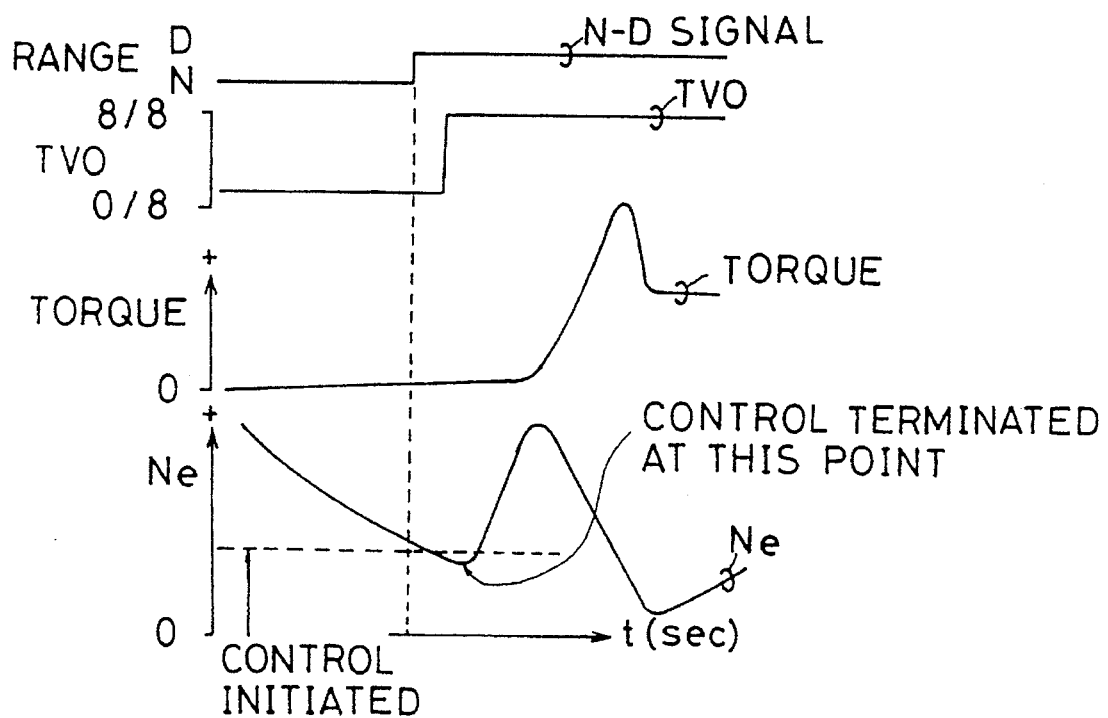
FIG. 6 is a time chart illustrating conventional operating conditions.

If such control is carried out, then as shown in FIG. 5, when the speed of the engine 1 is reducing from a high speed, then even with depression of the accelerator pedal so as to give a rapid take off immediately after a selector operation from a stop range to a drive range, by detecting the speed ratio the second throttle valve 7 can be maintained fully closed so as to control the increase in output from the engine 1 up until completion of the gear selecting operation. Therefore, as well as preventing excessive torque transmission force during selector operation and alleviating gear selection shock, the load on components such as the differential is reduced, thereby facilitating size and weight reduction of such components due to reduced endurance strength requirements.

Furthermore, with the present embodiment, once the gear selecting operation has been completed, the second throttle valve 7 is gradually opened until fully open. Any sudden increase of engine output can thus be suppressed so that the torque change becomes smoother, with an improvement in comfort.

The present embodiment is applied to a device having a second throttle valve for carrying out traction control. However it is of course also applicable to a device wherein the opening of a single throttle valve is electronically controlled through an actuator, corresponding to an amount of depression of the accelerator pedal. In this case the construction may be such that during the time from immediately after detection of a selector operation from a stop range to a drive range until the speed ratio has fallen below a predetermined value, the throttle valve is forcibly maintained below a predetermined opening. Throttle valve control of the increase in engine output has the advantage that conditions such as air-fuel ratio are not influenced. However, the construction may be such that the increase in engine output is controlled by reducing the fuel injection amount or retarding the ignition timing.

As described above, the construction of the present invention involves control of the increase in engine output during the period from immediately after selector operation from a stop range to a drive range of the automatic transmission until the speed ratio has fallen below a predetermined value and the gear selecting operation has been completed. Consequently, gear selection shock can be reliably alleviated and the load on components such as the differential can be reduced, enabling a reduction in endurance strength requirements.

INDUSTRIAL APPLICABILITY

With the above described method and apparatus for controlling the engine output of a vehicle fitted with an automatic transmission according to the present invention, since the gear selection shock in vehicles fitted with an automatic transmission can be alleviated at the time of selector operation, then ride comfort can be improved together with an increase in durability of components such as the differential. The vehicle is thus given a luxurious quality, which contributes to the automotive industry.

The claims defining the invention are as follows:

1. An apparatus for controlling an output of an engine of a vehicle fitted with an automatic transmission including a torque converter, wherein the engine has an intake system which includes a first throttle valve connected to an accelerator operation of the vehicle, and a second throttle valve not connected to the accelerator operation and normally maintained in a fully opened state, the apparatus comprising:

selector operation detection means for detecting a selector operation from one of a neutral (n) range and a parking (p) range to a drive range of the automatic transmission;

speed ratio detection means for detecting a speed ratio corresponding to an output rotational speed of the torque converter with respect to an input rotational speed of the torque converter; and engine output control means for placing and maintaining the second throttle valve in a fully closed state from when the selector operation was detected until when the detected speed ratio has fallen below a predetermined value, wherein the output of the engine is controlled as a result thereof.

2. An apparatus for controlling an output of an engine of a vehicle fitted with an automatic transmission as claimed in claim 1, wherein the engine output control means includes means for gradually opening the second throttle valve from the fully closed state after the speed ratio has fallen below the predetermined value until when the second throttle valve is in the fully open state.

3. An apparatus for controlling an output of an engine of a vehicle fitted with an automatic transmission as claimed in claim 1, further comprising:

means for determining an amount of wheel slip of the vehicle, wherein the second throttle valve has a traction control function which is operative to set the second throttle valve to the fully closed state from a previously open state when the amount of wheelslip becomes greater than a second predetermined value.

4. An apparatus for controlling an output of an engine of a vehicle fitted with an automatic transmission as claimed in claim 2, further comprising:

means for determining an amount of wheel slip of the vehicle, wherein the second throttle valve has a traction control function which is operative to set the second throttle valve to the fully closed state from a previously open state when the amount of wheel slip becomes greater than a second predetermined value.

5. A method for controlling an output of an engine of a vehicle fitted with an automatic transmission including a torque converter, wherein the engine has an intake system which includes a first throttle valve connected to an accelerator operation of the vehicle, and a second throttle valve not connected to the accelerator operation and normally maintained in a fully opened state, the method comprising the steps of:

a) detecting a selector operation from one of a neutral (n) range and a parking (p) range to a drive range of the automatic transmission;

b) detecting a speed ratio corresponding to an output rotational speed of the torque converter with respect to an input rotational speed of the torque converter; and c) placing and maintaining the second throttle valve in a fully closed state from when the selector operation was detected until when the detected speed ratio has fallen below a predetermined value, wherein the output of the engine is controlled as a result thereof.

6. A method for controlling an output of an engine of a vehicle fitted with an automatic transmission as claimed in claim 5, wherein the step c) further includes gradually opening the second throttle valve from the fully closed state after the speed ratio has fallen below the predetermined value until when the second throttle valve is in the fully open state.

7. A method for controlling an output of an engine of a vehicle fitted with an automatic transmission as claimed in claim 5, further comprising the step of:

d) determining an amount of wheel slip of the vehicle, wherein the second throttle valve has a traction control function which is operative to set the second throttle valve to the fully closed State from a previously open state when the amount of wheel slip becomes greater than a second predetermined value.

8. A method for controlling an output of an engine of a vehicle fitted with an automatic transmission as claimed in claim 6, further comprising the step of:

d) determining an amount of wheel slip of the vehicle, wherein the second throttle valve has a traction control function which is operative to set the second throttle valve to the fully closed state from a previously open state when the amount of wheel slip becomes greater than a second predetermined value.

* * * * *